(12) United States Patent
Bitto et al.

(10) Patent No.: US 7,363,689 B2
(45) Date of Patent: Apr. 29, 2008

(54) METHOD FOR PRODUCING VIBRATION-TYPE MEASURING SENSOR

(75) Inventors: Ennio Bitto, Aesch (CH); Christian Schutze, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/528,624

(22) Filed: Sep. 28, 2006

(65) Prior Publication Data

US 2007/0074585 A1    Apr. 5, 2007

Related U.S. Application Data

(62) Division of application No. 10/504,075, filed as application No. PCT/EP02/09211 on Aug. 17, 2002, now Pat. No. 7,134,347.

(30) Foreign Application Priority Data

Aug. 29, 2001 (EP) .................. 01120561
Feb. 20, 2002 (EP) .................. 02003821

(51) Int. Cl.
   *B23P 9/00*    (2006.01)
   *G01F 1/84*    (2006.01)

(52) U.S. Cl. ..................... 29/445; 73/861.355

(58) Field of Classification Search .............. 29/445, 29/469, 428, 407.05, 407.07, 407.08; 73/861.351–861.357
See application file for complete search history.

(56) References Cited

U.S. PATENT DOCUMENTS

| | | | |
|---|---|---|---|
| 4,876,898 A | 10/1989 | Cage et al. | |
| 5,301,557 A | 4/1994 | Cage et al. | |
| 6,332,367 B1 | 12/2001 | Ollila | |
| 6,802,224 B2 * | 10/2004 | Nakao et al. | 73/861.354 |
| 6,807,866 B2 * | 10/2004 | Drahm et al. | 73/861.355 |
| 6,807,868 B1 * | 10/2004 | Nakao et al. | 73/861.355 |
| 6,895,826 B1 * | 5/2005 | Nakao et al. | 73/861.355 |
| 2004/0040387 A1 | 3/2004 | Nakao | |

FOREIGN PATENT DOCUMENTS

WO    WO 01/33174    5/2001

* cited by examiner

Primary Examiner—John C. Hong
(74) Attorney, Agent, or Firm—Bacon & Thomas, PLLC

(57) ABSTRACT

This sensor, for a fluid and suitable for use in a pipeline at least temporarily containing the fluid flowing therethrough, has at least one curved measuring tube, which vibrates during operation and guides the fluid, and a housing enclosing the measuring tube. The housing is composed of a metal cap of two cap halves and a supporting tube, in which the measuring tube is held at its inlet and outlet ends in a manner such that the tube can oscillate, and out of which a measuring tube segment protrudes sideways. Each cap half has an edge with, in each case, four edge portions. The edge portions are straight, the edge portions are curved, and the edge portions have the shape of circular arcs. The edge portions are welded continuously to the supporting tube and the edge portions are welded continuously to one another. The cap halves are cut out of a dish-shaped intermediate having a formed, surrounding edge bead, provided with the shape of a quarter-torus by metal spinning.

8 Claims, 5 Drawing Sheets

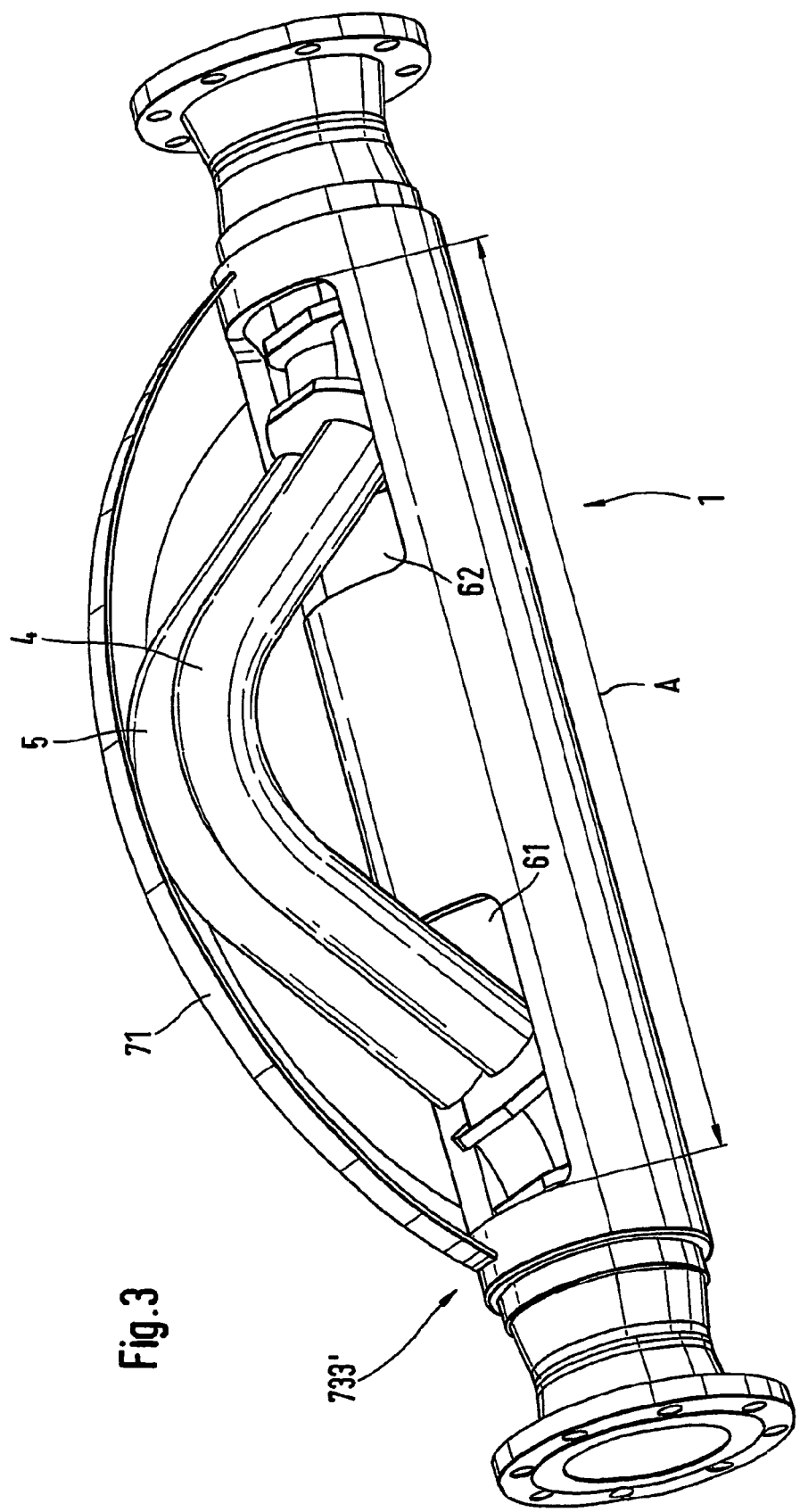

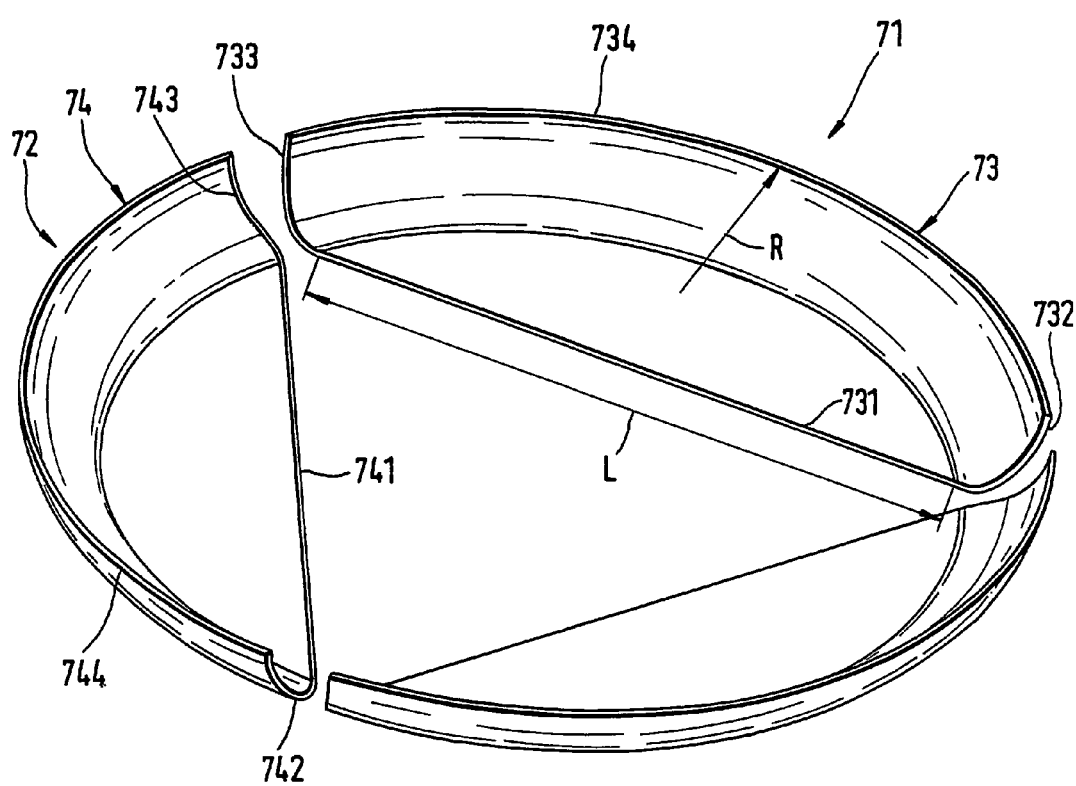

METHOD FOR PRODUCING VIBRATION-TYPE MEASURING SENSOR

This application is a divisional of U.S. patent application Ser. No. 10/504,075, which was filed on Aug. 9, 2004; which is a 371 of PCT/EP02/09211 filed on Aug. 17, 2002, which is now U.S. Pat. No. 7,134,347.

FIELD OF THE INVENTION

The invention relates to a vibration-type measuring pickup or sensor for a fluid to be measured. The sensor is suitable for installation in a pipeline at least temporarily containing fluid flowing therethrough.

BACKGROUND OF THE INVENTION

Such sensors usually include at least one curved measuring tube for guiding the fluid and at least one housing surrounding the measuring tube. The measuring tube vibrates during operation.

The main representatives of such sensors are mass-flow/density/viscosity sensors operating on the Coriolis principle. These sensors can not only be used to measure the instantaneous mass flow of the fluid flowing in the pipeline, but also the density of the fluid, on the basis of the instantaneous oscillation frequency of the measuring tubes, and the viscosity of the fluid, on the basis of the power required to maintain their oscillations, as well as the temperature of the fluid. The mass flow is, by definition, the mass of fluid flowing through each measuring tube cross section per unit time.

U.S. Pat. No. 4,876,898 describes a Coriolis mass flow sensor for use at temperatures up to 220° C. This sensor, which is suitable for use in a pipeline at least temporarily containing fluid flowing therethrough, includes:
two parallel, curved measuring tubes that vibrate during operation and guide the fluid,
a metal housing covering the measuring tubes, and
a supporting arrangement of metal,
  in which the measuring tubes are held at their inlet and outlet ends in a manner such that the tubes can oscillate, and
  out of which the measuring tubes protrude sideways,
  which metal housing includes a first cap half and a second cap half for enclosing the measuring tubes,
    an edge of which first cap half includes a circular-arc-shaped first edge portion lying in a first plane and having a first radius of curvature and a circular-arc-shaped second edge portion lying in a second plane perpendicular to the first plane and having a second, significantly smaller, radius of curvature, and
    an edge of which second cap half includes a circular-arc-shaped third edge portion lying in a third plane and having the first radius of curvature and a circular-arc-shaped fourth edge portion lying in a fourth plane perpendicular to the third plane and having the second radius of curvature,
  wherein the first and second edge portions are welded continuously to one another, and
  wherein the second and the fourth edge portions are welded continuously to the supporting arrangement.

Additionally, U.S. Pat. No. 5,301,557 describes a Coriolis mass flow sensor, which is suitable for use in a pipeline at least temporarily containing fluid flowing therethrough and which includes:
two parallel, curved measuring tubes that vibrate during operation and guide the fluid,
a supporting arrangement of metal,
  in which the measuring tubes are held at their inlet and outlet ends in a manner such that the tubes can oscillate, and
  out of which the measuring tubes protrude sideways, and
a curved metal tube completely enclosing the measuring tubes,
  which follows the route of the measuring tubes, while maintaining a uniform spacing therefrom, and
  which, after having been bent to match the route of the measuring tubes and then temporarily divided into two equal tube halves along a longitudinal cutting plane, is then assembled to enclose the measuring tubes and put back together again by welding of the tube halves to one another, and
  whose ends are welded continuously with the supporting arrangement.

The mentioned U.S. Pat. No. 5,301,557 also describes a Coriolis mass flow sensor, which is suitable for use in a pipeline at least temporarily containing fluid flowing therethrough and which includes:
two parallel, curved measuring tubes that vibrate during operation and guide the fluid,
a supporting arrangement of metal,
  in which the measuring tubes are held at their inlet and outlet ends in a manner such that the tubes can oscillate, and
  out of which the measuring tubes protrude sideways, and
a metal tube completely enclosing the measuring tubes and composed of sectionally straight tube portions terminally welded to one another,
  which are made from deep-drawn half-shells continuously welded to one another following their placement around the measuring tubes.

Finally, a Coriolis mass-flow/density sensor is offered by the Endress+Hauser group of firms under the label Promass F. This sensor, which is suitable for use in a pipeline at least temporarily containing fluid flowing therethrough, includes:
two parallel, curved measuring tubes that vibrate during operation and guide the fluid,
a metal housing enclosing the measuring tubes,
  having a supporting tube of metal,
    in which the measuring tubes are held on their inlet and outlet ends in a manner such that the tubes can oscillate, and
    out of which measuring tube segments protrude sideways through two cutouts, and
  having a deep-drawn metal cap for covering the measuring tube segments,
    an edge of which is continuously welded with the supporting tube.

The deep drawing of shaped bodies of metal, including also the above-mentioned metal caps, is done in a corresponding metal deep-drawing die, the manufacturing costs of which are very high. Deep drawing is, consequently, worthwhile only in the case of sufficiently high production quantities of the shaped bodies to be produced therewith. Since the mentioned Coriolis mass-flow/density sensor Promass F is manufactured in a number of different standard, nominal sizes up to 100 mm, in each case in large production quantities, deep drawing of the metal caps is economical, even though a separate deep drawing die is required for each nominal size.

However, if, for certain nominal sizes, especially for nominal sizes greater than 100 mm, but even for nonstandard nominal sizes less than 100 mm, only smaller production quantities are expected, then the manufacture of the metal caps by means of such deep drawing dies specially sized for the individual nominal sizes cannot be practically realized, because of the high costs.

SUMMARY OF THE INVENTION

An object of the invention is to provide a vibration-type sensor having a metal cap which can be manufactured at lower cost than previously possible, particularly by cold forming. A further object of the invention is to provide a method for connecting the metal cap with a supporting arrangement of a vibration-type measuring sensor permitting manufacture of the sensor at lower total cost.

For solving these objects, the invention provides a vibration-type sensor for a fluid, the sensor being suitable for use in a pipeline at least temporarily containing fluid flowing therethrough and including:

at least one curved measuring tube that vibrates during operation and guides the fluid, and a metal housing enclosing the at least one measuring tube, having a supporting arrangement of metal,
in which the at least one measuring tube is held at its inlet and outlet ends in a manner such that the tube can oscillate, and
out of which a measuring tube segment protrudes sideways, and
having a metal cap composed of a first cap half and a second cap half for covering the measuring tube segment, or segments, as the case may be,
an edge of which first cap half includes a first edge portion, a second edge portion, a third edge portion, and a circular-arc-shaped fourth edge portion, and
an edge of which second cap half includes a fifth edge portion, a sixth edge portion, a seventh edge portion, and a circular-arc-shaped eighth edge portion,
wherein the first, second and third edge portions, respectively the fifth, sixth and seventh edge portions, are connected continuously with the supporting arrangement, and
wherein the fourth and the eighth edge portions are connected continuously with one another.

For solving the named objects, the invention provides further a method for producing a connection of a metal cap with a supporting arrangement of a vibration-type sensor for a fluid, the sensor being suitable for use in a pipeline at least temporarily containing fluid flowing therethrough and including:

at least one curved measuring tube that vibrates during operation and guides the fluid, and a metal housing enclosing the at least one measuring tube, having a supporting arrangement of metal,
in which the at least one measuring tube is held at its inlet and outlet ends in a manner such that the tube can oscillate, and
out of which a measuring tube segment protrudes sideways, and
having a metal cap composed of a first cap half and a second cap half for covering the measuring tube segment, or segments, as the case may be,
an edge of which first cap half includes a first edge portion, a second edge portion, a third edge portion, and a fourth edge portion, and
an edge of which second cap half includes a fifth edge portion, a sixth edge portion, a seventh edge portion, and an eighth edge portion,
wherein the first, second and third edge portions, respectively the fifth, sixth and seventh edge portions, are to be connected continuously with the supporting arrangement, and
wherein the fourth and the eighth edge portions are to be connected continuously with one another, in which method a segment is cut in such a manner out of a dish-shaped intermediate having a surrounding edge bead formed thereon,
that the first edge portion and the fourth edge portion, respectively the fifth edge portion and the eighth edge portion, and, at the edge bead, the second and the sixth, respectively the third and the seventh edge portions, are created, a first of these segments is placed on the supporting arrangement for covering a first half of the measuring tube part, or measuring tube parts, as the case may be, a second of these segments is placed on the supporting arrangement for covering a second half of the measuring tube part, or measuring tube parts, as the case may be, in such a manner,
that the fourth and the eighth edge portions lie opposite to one another, the first, the second, the third, the fifth, the sixth and the seventh edge portions are welded completely to the supporting arrangement, and the fourth edge portion is welded completely to the eighth edge portion.

According to a preferred development of the method, the intermediate is formed from a flat, circular sheet, which is provided with a quarter-torus-shaped edge bead by metal spinning.

An advantage of the invention is that, although by going back to the two cap halves (known per se) a connecting seam becomes necessary between them, the costs of the deep drawing die for the metal cap are reduced to the smaller manufacturing costs of the cap halves.

The invention will now be explained in greater detail on the basis of the figures of the drawing showing a preferred example of an embodiment. Functionally equivalent parts are given the same reference characters throughout the figures. However, reference characters are only repeated in subsequent figures to the extent such is helpful.

BRIEF DESCRIPTION OF THE DRAWINGS

FIG. 3 shows in perspective, and slightly from above, the sensor of FIGS. 1 and 2, with a cap-half removed, FIG. 6 shows finished cap halves in perspective.

DESCRIPTION OF THE PREFERRED EMBODIMENTS

Figure 2:
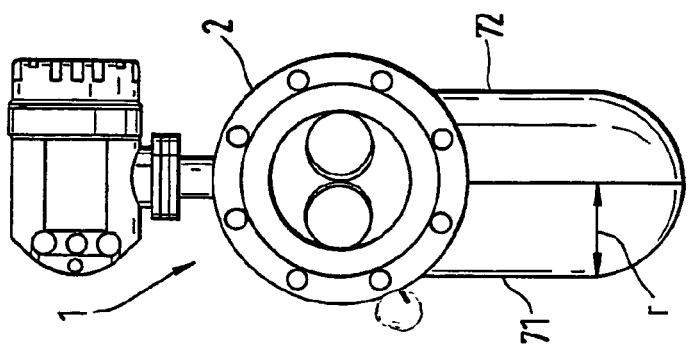
FIG. 2 shows a front view of the sensor of FIG. 1.
Figure 1:
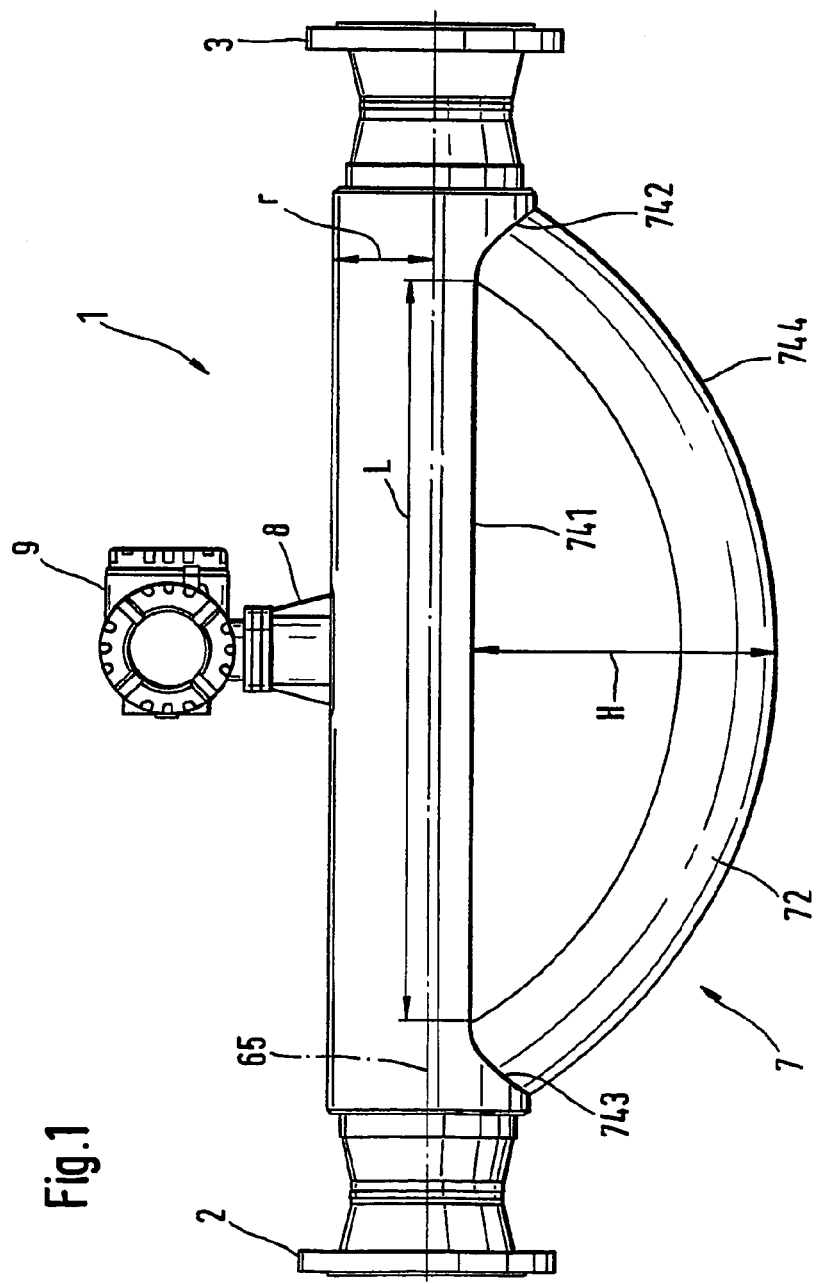
FIG. 1 shows a side view of a sensor in the form of a Coriolis flow/density/viscosity sensor.
Figure 4:
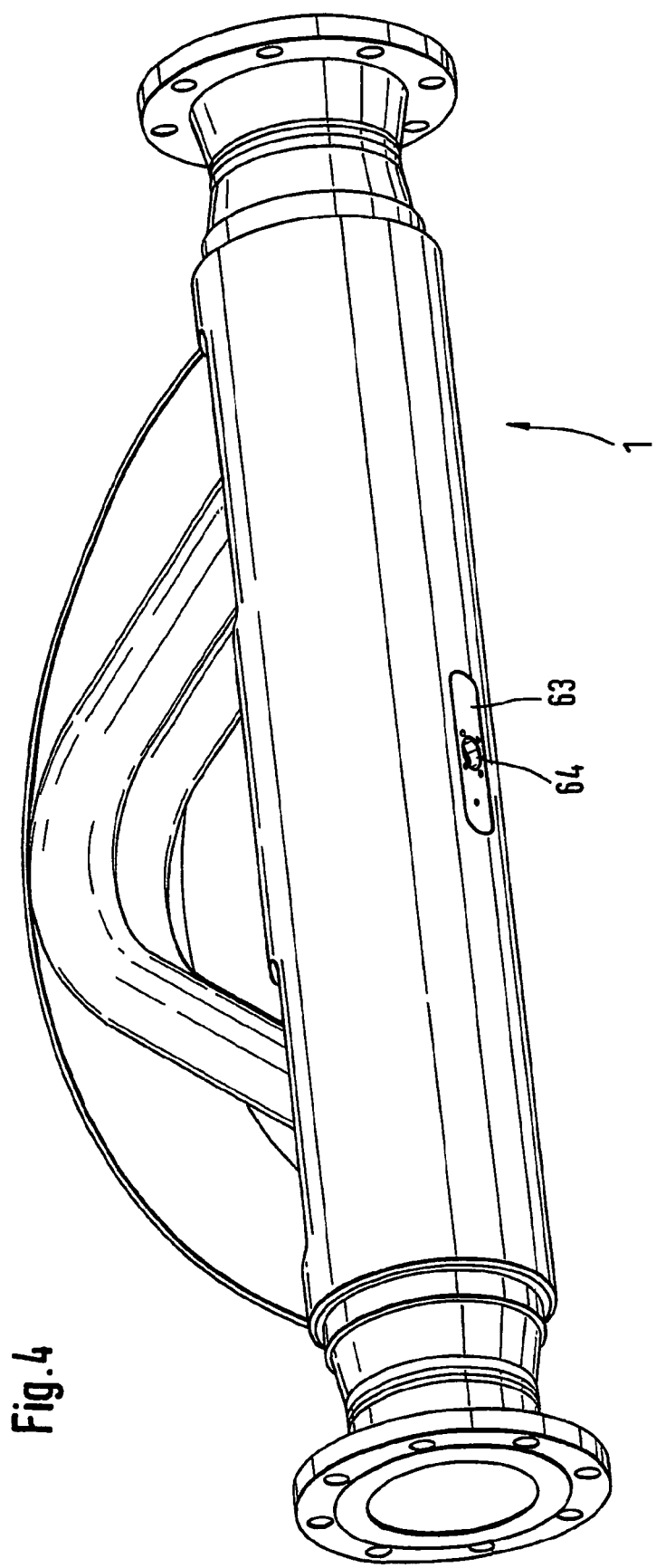
FIG. 4 shows in perspective, and slightly from below, the sensor of FIG. 3.

FIGS. 1 to 4 show a vibration-type sensor 1, here a Coriolis flow/density/viscosity sensor, in various views, with FIG. 1 being a side view of the measuring sensor 1, FIG. 2 its front view, and FIGS. 3 and 4 perspective views of the sensor 1 from two different viewing angles. FIGS. 1 to 4 are explained as a group in the following.

Sensor 1 is connected by way of flanges 2, 3 into the course of a pipeline of a given diameter, containing a liquid, gaseous or vaporous fluid to be measured flowing therethrough. For reasons of clarity, the pipeline is not shown here. Instead of flanges, the sensor 1 can also be connected into the pipeline by other known means, such as e.g. Triclamp connectors or screw connections.

The sensor has two parallel measuring tubes 4, 5 for guiding the fluid, which are each curved in a plane; it is also feasible to use only a single measuring tube, or at least one measuring tube curved in a screw shape can be provided.

The measuring tubes 4, 5 are excited during operation into tuning-fork-like vibrations, preferably resonance vibrations, by an exciter arrangement usually at the crest of the measuring tubes 4, 5, this not being shown here for reasons of clarity. For the same reason, two sensor arrangements are also not shown, one of which is fixed on the inlet side on the measuring tubes 4, 5, and the other on the outlet side, preferably at equal spacings from the crest.

The measuring tubes 4, 5 are enclosed by a housing, which is composed, on the one hand, of a supporting arrangement of metal, here a supporting tube 6, and, on the other hand, of a metal cap 7; the supporting tube 6 is a cylinder of circular cross section in this embodiment.

The measuring tubes 4, 5 are held in the supporting arrangement, here in the supporting tube 6, at their inlet and outlet ends in a manner such that the tubes can oscillate. Each measuring tube 4, 5 has a measuring tube segment protruding sideways out of the supporting arrangement. As can be seen in FIG. 3, the laterally protruding measuring tube segments extend through two cutouts 61, 62 of the supporting tube 6.

The metal cap 7 is composed of a first cap half 71 and a second cap half 72; in FIGS. 3 and 4, the latter is not shown, in order that the measuring tubes 4, 5 can be seen. The metal cap 7 composed of the two cap halves 71, 72 completely covers the measuring tube segments 4, 5 in the finished state of the sensor 1, but does not contact them, in order not to disturb their vibrations. The parts of the sensor 1 inside of the housing formed by the supporting arrangement, here by the supporting tube 6, and the metal cap 7 are hermetically sealed by the housing with respect to the environment.

The first cap half 71 has a peripheral edge 73 and the second cap half 72 a peripheral edge 74; see FIG. 6. Edge 73 is composed of a first edge portion 731, a second edge portion 732, a third edge portion 733 and a circular-arc-shaped fourth edge portion 734. Edge 74 is composed of a fifth edge portion 741, a sixth edge portion 742, a seventh edge portion 743 and a circular-arc-shaped eighth edge portion 744. The edge portions 731, 741 are preferably straight in the illustrated embodiment, but other lines are possible.

The edge portions 732, 733, 742, 743 can be straight, when e.g. the supporting arrangement has a square or rectangular cross section, so that these edge portions abut on the associated flat lateral surfaces and are connected therewith. Even in the case of the cylindrical supporting tube 6 of the embodiment, its lateral surface can be provided with a flat abutment surface, so that the edge portions 732, 733, 742, 743 can be straight.

The edge portions 731, 732, 733 of the edge 73 and the edge portions 741, 742, 743 of the edge 74 are continuously connected, here welded, with the supporting arrangement, here the supporting tube 6. The edge portions 734, 744 are continuously connected, here, likewise, welded, to one another.

The edge portions 731, 741 are, as mentioned, straight in this embodiment, have a length L and lie on the lateral surface of supporting tube 6, along elements of the lateral surface. The edge portions 734, 744 have the shape of a circular arc of radius R, whose height H is greater than the maximum separation of the measuring tube segments from the center line of the supporting tube 6. The exact form of the edge portions 732, 733, 742, 743 is explained further in connection with the explanation of the manufacture of the cap halves 71, 72.

Finally, in FIG. 1, there is an electronics housing 9 mounted on the supporting arrangement, here on the supporting tube 6, by means of a neck-like connecting piece 8. Housing 9 contains the measuring and operational circuit for the sensor 1. This circuit produces, on the one hand, an exciter signal driving the mentioned exciter arrangement and, on the other hand, receives the signals of the mentioned sensor arrangements and generates therefrom desired signals representing mass flow, density, viscosity or temperature of the flowing fluid, which signals can be processed further or displayed.

FIGS. 3 and 4 omit the connecting piece 8 and the electronics housing 9; FIG. 4 does show the seating surface 63 for the connecting piece 8. An electrical conduit 64 is arranged in the seating surface 63 and enables electrical connections for the above-mentioned exciter arrangement and for the above-mentioned sensor arrangements, as well as for other electrical components which may be present, such as e.g. temperature sensors.

An example of an embodiment of a method for creating a connection between the metal cap 7 and the supporting arrangement, here the supporting tube 6, of the vibration-type sensor 1 will now be explained on the basis of FIGS. 5 and 6. This connection method is based on a dish-shaped intermediate having a surrounding, continuous, peripheral edge bead.

In the embodiment, the intermediate is an essentially circular intermediate 70 formed from a flat, circular sheet, which, by metal spinning, is provided with a quarter-torus-shaped edge bead 701.

Metal spinning involves a cold forming of metals, wherein a sheet to be formed is pressed by means of appropriately formed rollers into a form of wood or metal. Either the sheet rotates and the rollers are fixed in space, although they each can rotate on a journal axis; or the sheet is fixed and the rollers rotate about a principal axis, in addition to their rotation about their journal axes.

Figure 5:
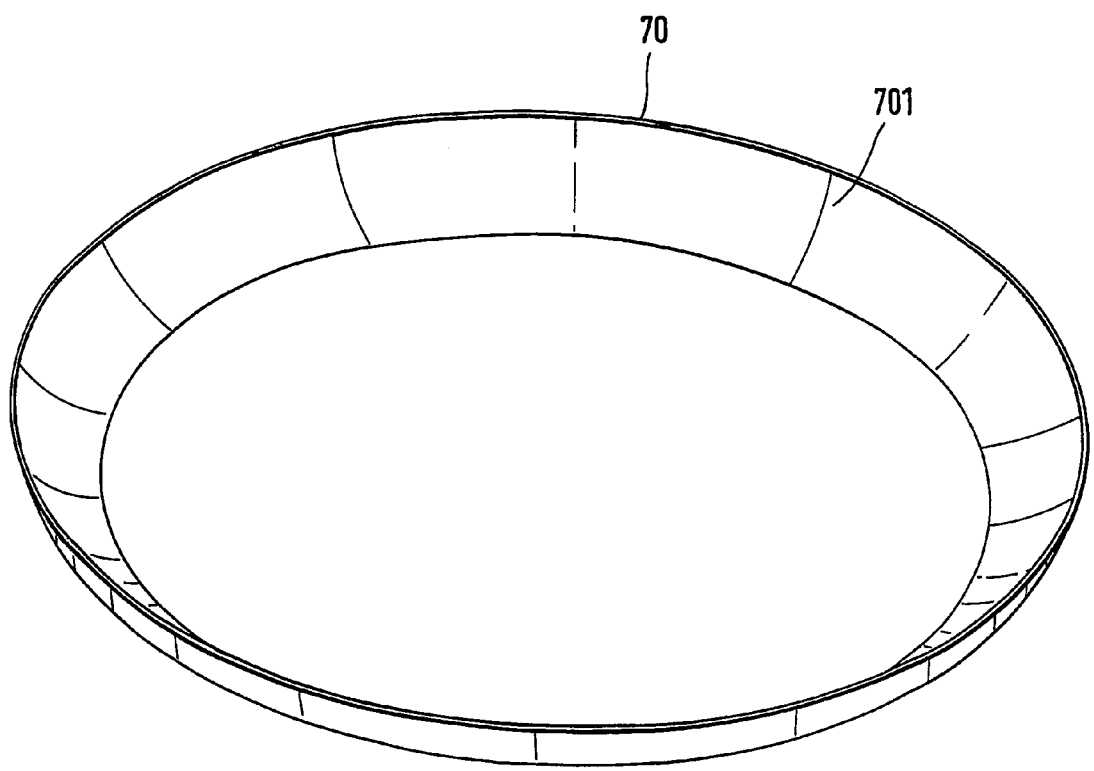
FIG. 5 shows in perspective an intermediate used in making the cap halves.

While FIG. 5 shows a circular intermediate 70, it can have any other suitable shape, e.g. that of a square or a rectangle. To form the edge bead in these other cases, the edges of the sheet can be, so-to-say, flipped up, to included angles between about 150° and preferably 90°, so that a square or rectangular box is formed.

Such a box can have the advantage compared with the circular intermediate 70, that, with appropriate dimensioning, cap halves can be cut from it for more than a single nominal size. Due, however, to the optical impression of the vibration sensor 1 achieved with the circular intermediate 70, thus on the basis of its attractive design, the circular intermediate 70 is preferably used.

After the intermediate, here the circular intermediate 70, has been manufactured, as many segments are cut from it, as is shown in FIG. 6, as its dimensions permit; in FIG. 6, three such segments are illustrated as possible, of which two are used for a first sensor and the third segment for a second sensor.

Preferably, the cutting is done by laser cutting in an appropriate cutting device; this makes it possible to obtain every desired shape of edge on a segment to be cut out. The cutting of the segments from the intermediate produces the edge portions 731, 732, 733, 734, respectively 741, 742, 743, 744, already described above.

This cutting feature is especially important, when, as in the illustrated embodiment, on the one hand, the edge bead 701 is of quarter-torus-shape, and, on the other hand, the supporting arrangement is in the form of a cylindrical supporting tube 6. In such case, the spatial shapes of the edge portions 732, 733, 742, 743 following the lateral surface of the supporting tube 6 are given by the spatial intersection curves of the always circular cross sections of the supporting tube 6 with the quarter-torus-shaped edge bead 701. Such is indicated by way of example by arrow 733' in FIG. 3.

From the already mentioned condition that the cap halves 71, 72 must not interfere with the vibrations of the measuring tubes 4, 5, i.e. thus that the tubes must oscillate freely, and, consequently, that there must be a safety spacing s for the metal cap, the dimensioning of the intermediate, especially the circular intermediate 70 with the quarter-torus-shaped edge bead 701, can be specified as follows.

The parameters, as already defined above, of length L of the edge portions 731, 741, height H of the circular arc of the edge portions 734, 744, as well as the radius r of the quarter torus, see FIG. 2, must be chosen such that the following conditions are maintained:

L greater than the distance A of the inlet-side border of the cutout 61 from the outlet-side border of the cutout 62, see FIG. 3, or greater than a corresponding distance in the case of a differently shaped supporting arrangement, H greater than the distance of the crest of the measuring tube segments from the centerline 65 of the support arrangement, plus safety spacing s, r equal to twice the outer diameter of a measuring tube, plus the mutual separation of the measuring tubes—in the case where more than one measuring tube is present-plus 2s.

The cutting out of the segments 71, 72 is performed such that the edge 731 respectively the edge 734 and at the edge bead 701 the edge portion 732 and the edge portion 741 respectively the edge portion 733 and the edge portion 743 are created. A first of these segments is placed on the supporting arrangement, here the supporting tube 6, for covering a first half of the measuring tube part, or measuring tube parts, as the case may be. A second of these segments is likewise placed on the supporting arrangement, here again the supporting tube 6, for covering a second half of the measuring tube part, or measuring tube parts, as the case may be, in such a manner that the fourth edge portion 734 and the eighth edge portion 744 lie opposite to one another.

The edge portions 731, 732, 733, 741, 742, 743 are then completely welded to the supporting arrangement, here to the supporting tube 6, and likewise the edge portion 734 to the edge portion 744.

The invention claimed is:

1. A method for producing a connection of a metal cap to a supporting arrangement of a vibration-type sensor for a fluid, the sensor being suitable for use in a pipeline at least temporarily containing the fluid flowing therethrough, comprising the steps of:
   providing at least one curved measuring tube that vibrates during operation and guides the fluid;
   providing a metal housing enclosing the at least one measuring tube, the housing having the supporting arrangement of metal, in which the at least one measuring tube is held at its inlet and outlet ends in a manner such that the tube can oscillate, and out of which a measuring tube segment protrudes sideways, and having the metal cap composed of a first cap half and a second cap half for covering the measuring tube segment, or measuring tube segments, an edge of the first cap half including a first edge portion, a second edge portion, a third edge portion, and a fourth edge portion, and an edge of the second cap half including a fifth edge portion, a sixth edge portion, a seventh edge portion, and an eighth edge portion;
   connecting the first, second and third edge portions, respectively the fifth, sixth and seventh edge portions, continuously to the supporting arrangement; and
   connecting the fourth and the eighth edge portions continuously to one another; and
   cutting a segment in such a manner out of a dish-shaped intermediate having a surrounding edge bead formed thereon, that the first edge portion and the fourth edge portion, respectively the fifth edge portion and the eighth edge portion, and, at the edge bead, the second edge portion and the sixth edge portion, respectively the third edge portion and the seventh edge portion, are created, wherein:
   a first of these segments is placed on the supporting arrangement, covering a first half of the measuring tube part, or measuring tube parts,
   a second of these segments is placed on the supporting arrangement, covering a second half of the measuring tube part, or measuring tube parts, in such a manner that the fourth and the eighth edge portions lie opposite one another,
   the first, the second, the third, the fifth, the sixth and the seventh edge portions are welded completely to the supporting arrangement, and
   the fourth edge portion is welded completely to the eighth edge portion.

2. The method as claimed in claim 1, wherein:
   a circular intermediate is formed from a flat, circular sheet, which is provided with a quarter-torus-shaped edge bead by metal spinning.

3. A method for producing a vibration-type sensor for a fluid, the sensor being suitable for use in a pipeline at least temporarily containing the fluid flowing therethrough, and the sensor comprising: at least one curved measuring tube that vibrates during operation and guides the fluid; and a metal housing enclosing the at least one curved measuring tube, the metal housing including a supporting arrangement of metal, in which the at least one curved measuring tube is held at its inlet and outlet ends in a manner such that the at least one curved measuring tube can oscillate, and out of which a measuring tube segment protrudes sideways, the metal housing including a metal cap for covering the at least one curved measuring tube segment, the metal cap being composed of a first cap half and a second cap half, an edge of the first cap half including a first edge portion, a second edge portion, a third edge portion, and a fourth edge portion, and an edge of the second cap half including a fifth edge portion, a sixth edge portion, a seventh edge portion, and an eighth edge portion, said method comprising the steps of:
   providing each of the first and, second cap halves; and
   connecting each of the first, second and third edge portions of the first cap half continuously to the supporting arrangement, connecting each of the fifth, sixth and seventh edge portions of the second cap half continuously to the supporting arrangement, and connecting the fourth and the eighth edge portions continuously to one another for providing the metal housing and wherein: the step of providing each of the first and second cap halves comprises a step of cutting a segment in such a manner out of a dish-shaped intermediate having a surrounding edge bead formed thereon, that the first edge portion and the fourth edge portion, respectively the fifth edge portion and the eighth edge portion, and, at the edge bead, the second edge portion and the sixth edge portion, respectively the third edge portion and the seventh edge portion, are created.

4. The method as claimed in claim 3, wherein:

a first of these segments is placed on the supporting arrangement, covering a first half of the measuring tube part, or measuring tube parts, a second of these segments is placed on the supporting arrangement, covering a second hall of the measuring tube part, or measuring tube parts, in such a manner, that the fourth and the eighth edge portions lie opposite one another, the first, the second, the third, the fifth, the sixth and the seventh edge portions are welded completely to the supporting arrangement, and the fourth edge portion is welded completely to the eighth edge portion.

5. The method as claimed in claim 4, wherein: the dish-shaped circular intermediate is formed from a flat, circular sheet, which is provided with a quartertorus-shaped edge.

6. The method as claimed in claim 5, wherein: the quarter-torus-shaped edge of said dish-shaped circular intermediate is bead by metal spinning of said circular sheet.

7. The method as claimed in claim 3, wherein:

the dish-shaped circular intermediate is formed from a flat, circular sheet, which is provided with a quarter-torus-shaped edge.

8. The method as claimed in claim 7, wherein:

the quarter-torus-shaped edge of the dish-shaped circular intermediate is formed as a bead by metal spinning of the circular sheet.

* * * * *